June 23, 1970   H. A. McINTOSH ET AL   3,517,150

SOLDERING ASSEMBLY AND METHOD

Filed Oct. 22, 1965

INVENTORS.
HAROLD A. McINTOSH
EDMOND M. WAGNER

BY THEIR ATTORNEYS.
HARRIS, KIECH, RUSSELL & KERN

United States Patent Office 3,517,150
Patented June 23, 1970

3,517,150
SOLDERING ASSEMBLY AND METHOD
Harold A. McIntosh, South Pasadena, and Edmond M. Wagner, Sierra Madre, Calif.; said McIntosh assignor, by mesne assignments, to Robertshaw Controls Company, Richmond, Va., a corporation of Delaware
Filed Oct. 22, 1965, Ser. No. 500,756
Int. Cl. B23k 1/12, 13/00, 35/00
U.S. Cl. 219—9.5                                    4 Claims

ABSTRACT OF THE DISCLOSURE

Method and article for joining wires, with abutting wires held together in alignment by a single coil spring of hard solder wire, and with induction heating for fusing the solder to form the junction.

---

This invention relates to an assembly and a method for soldering and, more particularly, to a new and improved assembly and method of soldering of the abutting ends of various components, such as axially aligned wires, particularly adapted for the use of induction soldering techniques.

The use of high frequency induction as a means of heating metals is well known, the degree of heat depending on the process required. One use of induction heating is for the purpose of raising the metal to the melting point for purposes of soldering or fusing a joint between two or more separate pieces. When a joint is to be made by use of an additive metal the process is generally classified as "soldering," especially when the additive metal has a lower melting point than the metals to which it is added.

In properly soldering a joint, it is desirable that the metal or metals to which the solder is applied be heated to a temperature above the melting temperature of the solder material so that the melted solder will flow and coat with a strong bond the metals being joined. The application of heat to successfully make a solder joint should provide a rate of heat flow to the metals involved that will achieve the required temperature in all parts of the joint before the solder becomes fluid. Frequently this is accomplished by applying the solder to the joint after the other materials are heated to the necessary temperature. In some instances it is desirable to place the solder material to the joint prior to heating, with provision for retaining the solder material at the joint until the metals to be joined are above the critical temperature for soldering.

Typically, induction heating is accomplished by placing the joint to be made in a suitably proportioned coil of copper tubing, through which water is circulated to prevent overheating of the coil. Alternating current of high frequency is applied to the coil. Any material within the coil will rapidly increase in temperature due to the induced molecular friction caused by the rapidly reversing electric field. Materials subjected to such induced heat will increase temperature at different rates, due to such factors as the density, mass, shape and resistivity of the material. Generally the solder material will be less in mass and have a higher rate of heating than the metals to be joined. It then becomes impractical or difficult to make soldered joints with preplaced solder material.

It is an object of our invention to provide a method to overcome the difficulty with the rate of heating by providing a solder material in the form of a coil spring with multiple turns of relatively small diameter wire. The coil spring size and shape may be varied to suit the configuration of the joint to be made.

It is an object of our invention to utilize such a coil spring as an alignment spring positioned around the abutting ends of the elements being joined, as well as a source of the solder. A further object of our invention is to utilize the effect of such a coil spring as a secondary induction coil resulting in more rapid heating of the materials within the coil.

By proper proportioning of such a coil, it has been found that an excellent solder joint is produced where it was previously impossible to achieve a satisfactory joint by other methods and solder forms.

In practice it is frequently desirable or necessary to supply a flux to the metals to be soldered. It was found that coating the solder material coil with flux was an excellent method of supplying the desired flux action.

Many sizes and shapes of coils as well as frequencies and currents may be used for various types of joints within the scope of this process. It is only necessary to determine the proper porportions for the various factors of size, shape, mass, etc., for each application.

Other objects, advantages, features and results will more fully appear in the course of the following description. The drawing merely shows and the description merely describes a preferred embodiment of the present invention which is given by way of illusrtation or example.

Figure 1:
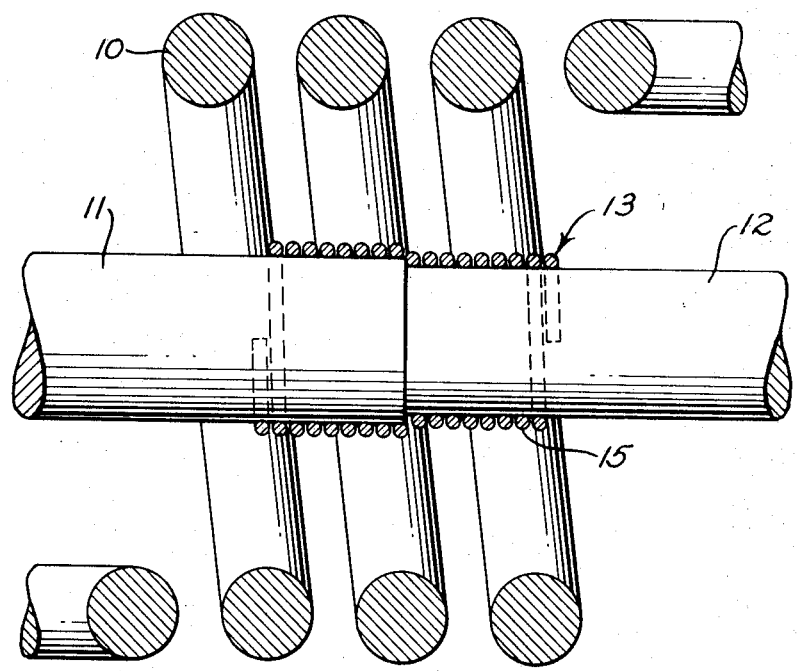
FIG. 1 is a view illustrating the wire and solder coil spring assembly inserted in an induction heating device.

In the embodiment shown in FIG. 1, two wires 11 and 12 are abutted together at their ends in axial alignment. The solder material 13, typically silver alloy, is provided in wire form and is wound into a coil spring 15 having an internal diameter substantially the diameter of the two wires 11 and 12. The coil spring 15 is then positioned around the two wires 11 and 12. As best shown in FIG. 1, the coil spring 15 is centered about the joint of the two wires 11 and 12 and acts to hold them in alignment during the soldering. The spring may be stretched placing it in tension for urging the wire ends together. The assembly is then placed within an induction coil 10 for heating by conventional high frequency induction.

Thus, it is seen that the coil spring 15 serves as an alignment spring, as a source of the solder and as a secondary induction coil for improving the heating operations.

Figure 2:
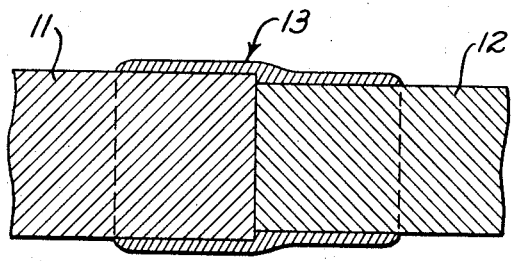
FIG. 2 is a longitudinal sectional view illustrating the final condition after the soldering process is completed.

In FIG. 2, the solder material 13 has flowed and coated the ends of the two wires 11 and 12 resulting in a strong bond at the joint. Of course, the invention is not limited to the soldering of wires and may be utilized for joining other metal elements in the same fashion.

A specific application of this process was made to join two wires with a silver alloy soldering material. One wire was a copper-nickel alloy, Copel XM, round wire .057 inch diameter and the other wire was copper round wire .051 inch diameter. The solder material was a silver alloy, Sil-Fos, round wire .006 inch diameter coiled to the form of a helical spring, approximately 1/16 inch inside diameter with the coils spaced a few thousandths of an inch apart. The Copel and copper wire ends were placed together in axial alignment with the Sil-Fos coil approximately centered around the joint. The assembly was placed in a two turn induction coil and a current of approximately one-half ampere at a frequency of 20 megacycles per second was applied for approximately five seconds. When desired, the spring 15 may be coated with a flux, as by dipping. A suitable flux is Handy and Harman "Handy Flux."

Figure 3:
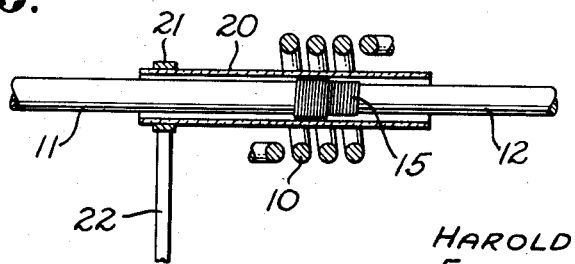
FIG. 3 is a view similar to FIG. 1 showing the assembly in a fixture.

The elements being joined may be manually supported within the heating coil 10 or may be supported in a jig or fixture for holding the parts during the heating operation, and various conventional fixtures may be used. A preferred fixture is illustrated in FIG. 3 and includes a tube 20 having an internal passage of a size to receive the wires and solder spring with very little clearance. The tube material should be nonconductive, have a high melting point, a low coefficient of thermal expansion, not wetted by molten solder, and not adversely affected by solder or flux. A preferred material is fused quartz.

A clamp ring 21 and support bracket 22 may be attached at an end of the tube 20 for positioning the tube within the heating coil. In one method of making a solder joint, the wire and solder spring assembly is placed in the tube, and current is applied to the induction coil for a short period of time. The tube provides support for the wires and also functions as a mold for the molten solder, controlling the shape of the finished joint. After the current is shut off, the soldered assembly is withdrawn from the tube. In an alternative method, one wire with the solder coil at the end thereof may be inserted in one end of the tube, with the second wire inserted at the opposite end of the tube. The second wire is pushed into the solder coil into abutment with the first wire and heating is performed as previously described.

In an alernative arrangement, a half tube in the form of a bar with a groove may be used in the same manner.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:
1. In a soldering assembly, the combination of:
   two elements abutting at their ends in axial alignment; and
   a uniformly meltable single helical coil spring of relatively rigid solder wire material positioned around and in circumferential engagement with both of said elements at said ends as an alignment spring and as the source of the solder said helical coil spring being under tension and serving as the sole means for maintaining abutting contact of said two elements.

2. A method of joining two elements in end-to-end relation, including the steps of:
   abutting two elements at their ends in axial alignment with only a circumferentially tensioned single helical coil spring of relatively rigid solder wire material positioned around and in circumferential engagement with said elements adjacent said ends;
   heating said coil spring and element ends for a period of time to melt the solder and dissolve the helical coil; and
   permitting the materials to cool forming a joint.

3. A method of joining two elements in end-to-end relation, including the steps of:
   abutting two elements at their ends in axial alignment with a helical coil spring of solder wire material positioned around said ends of said elements with the coil spring stretched to urge the element ends into abutment; and
   then heating said coil spring and element ends for a period of time to melt the solder and form a joint.

4. The method defined in claim 3 wherein the coil spring is coated with a flux and the heating is performed by placing said abutting elements and coil spring within an induction coil for high frequency induction heating.

References Cited

UNITED STATES PATENTS

| | | | |
|---|---|---|---|
| 1,572,740 | 2/1926 | Mattice | 219—85 X |
| 2,237,309 | 4/1941 | McMinn | 219—85 |
| 2,767,290 | 10/1956 | Chapman | 219—9.5 |
| 2,945,464 | 7/1960 | Tomoda. | |
| 2,948,796 | 8/1960 | Wall | 219—9.5 |
| 3,239,125 | 3/1966 | Sherlock | 228—56 |
| 3,274,331 | 9/1966 | Quigley | 228—56 X |
| 3,333,047 | 7/1967 | Geoffroi | 228—56 X |

JOSEPH V. TRUHE, Primary Examiner

P. W. GOWDEY, Assistant Examiner

U.S. Cl. X.R.

174—84, 94; 219—10.79, 85, 106, 117; 228—56